Nov. 28, 1950 F. W. SIDE 2,532,274
VIBRATOR
Filed Sept. 25, 1943 3 Sheets-Sheet 1

INVENTOR.
FREDERICK W. SIDE
BY
*EBSpangenberg*
ATTORNEY.

Nov. 28, 1950  F. W. SIDE  2,532,274
VIBRATOR
Filed Sept. 25, 1943  3 Sheets—Sheet 2

INVENTOR.
FREDERICK W. SIDE
BY
E. B. Spangenberg
ATTORNEY.

Nov. 28, 1950 F. W. SIDE 2,532,274
VIBRATOR
Filed Sept. 25, 1943 3 Sheets-Sheet 3
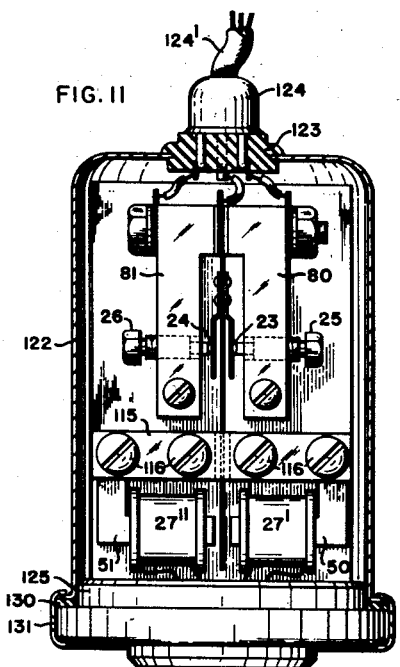
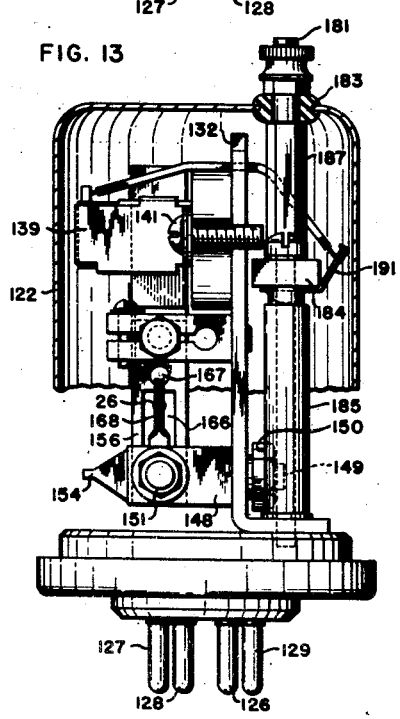
INVENTOR.
FREDERICK W. SIDE
BY
*E. B. Spangenberg*
ATTORNEY.

Patented Nov. 28, 1950

2,532,274

UNITED STATES PATENT OFFICE 2,532,274

VIBRATOR

Frederick W. Side, Philadelphia, Pa., assignor, by mesne assignments, to Minneapolis-Honeywell Regulator Company, Minneapolis, Minn., a corporation of Delaware Application September 25, 1943, Serial No. 503,758

16 Claims. (Cl. 200—90)

1

The present invention relates to automatic recording and controlling systems and is a continuation-in-part of my prior application filed December 1, 1941 and bearing Serial No. 421,176, now Patent No. 2,423,524 of July 8, 1947.

A general object of the present invention is to provide an improved arrangement for measuring, recording and/or controlling potential or current variations of minute magnitude.

A more specific object of the invention is to provide an improved electromagnetic switching means or vibrator which is capable of reliably switching small voltages, such as are present in a potentiometric recording and/or controlling instrument, over a long period of time without requiring attention.

A particular object of the present invention is to provide improvements in such an electromagnetic means or vibrator to prevent or at least minimize the introduction of extraneous alternating currents into the potentiometric measuring circuit from said switching means or vibrator. More specifically, an object of the invention is to provide improvements in the electromagnetic means for operating the switching means to attain this end.

The various features of novelty which characterize my invention are pointed out with particularity in the claims annexed to and forming a part of this specification. For a better understanding of the invention, however, its advantages and the specific objects obtained with its use, reference should be had to the accompanying drawings and descriptive matter in which are illustrated and described preferred embodiments of the invention.

In the drawings:

Fig. 1 diagrammatically illustrates a measuring system in which the switching means or vibrators of the invention may be advantageously employed;

Fig. 2 diagrammatically illustrates one form of vibrator that may be utilized in the system of Fig. 1;

Fig. 3 diagrammatically illustrates another form of vibrator that may be utilized in the system of Fig. 1;

Fig. 4 diagrammatically illustrates another form of vibrator that may be utilized in the system of Fig. 1;

2

Figure 2:
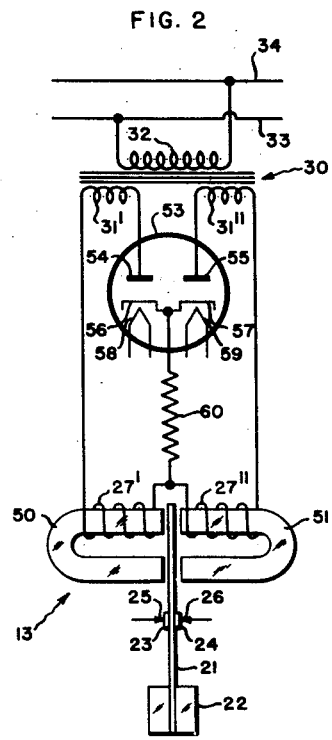
Figure 4:
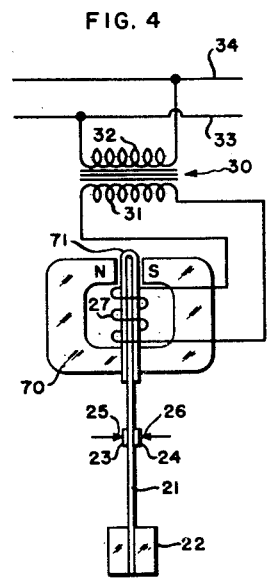
Figure 5:
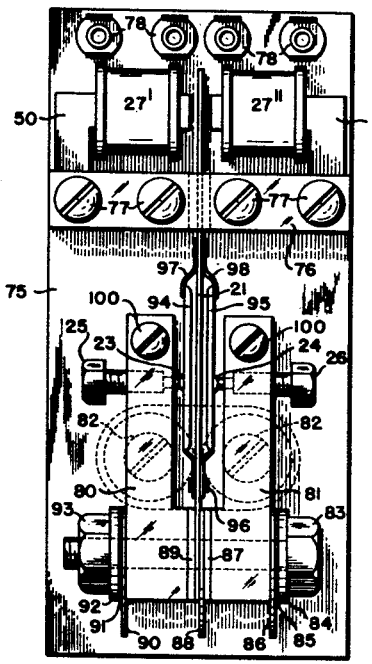
Fig. 5 is a front elevational view of a vibrator which may be of the type diagrammatically shown in Fig. 2.
Figures 6, 10:
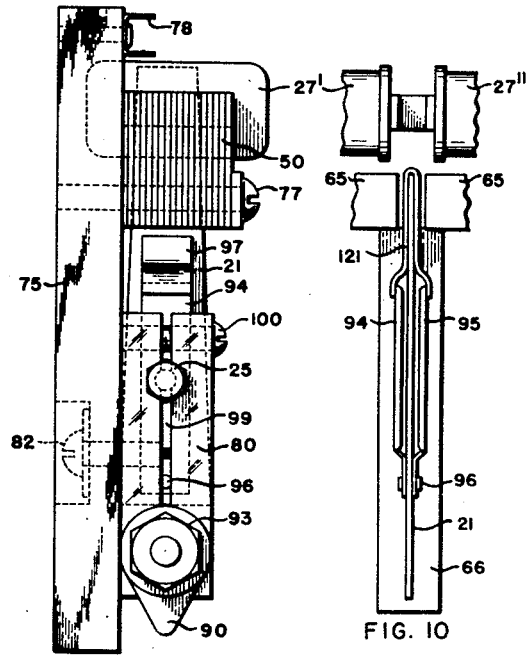
Fig. 6 is a side elevational view of Fig. 5.
Figures 8, 9:
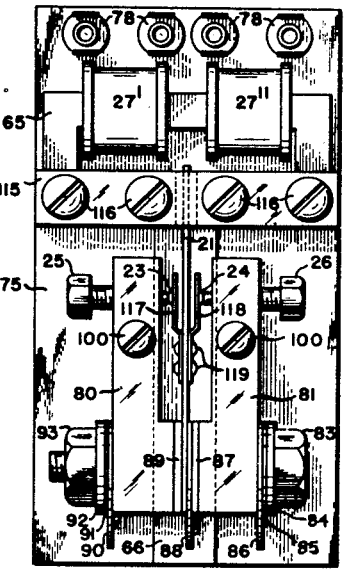
Fig. 8 is a partial front elevational view of a modification of Fig. 5.
Fig. 9 is a front elevational view of a vibrator which may be of the type diagrammatically shown in Fig. 3.

Fig. 10 is a partial front elevational view of a modification of Fig. 9;

Fig. 11 is a front elevational view of a vibrator of the type shown in Figs. 2 and 5 provided with a protecting cover shown in section;

Fig. 12 is a front elevational view of a vibrator which may be of the type diagrammatically shown in Fig. 4 and which is provided with a protecting cover also shown in section;

Fig. 13 is a side elevational view of Fig. 12 with a portion of the cover eliminated; and Fig. 14 is a rear elevational view of Fig. 12 with a portion of the cover omitted.

Figure 1:
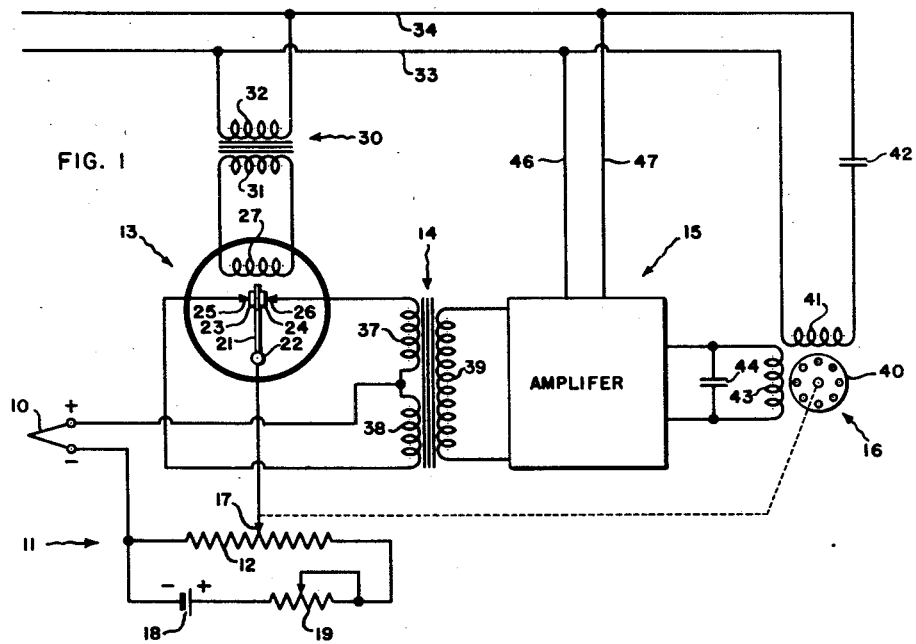

In Fig. 1 I have illustrated, more or less diagrammatically, my invention as applied to a measuring, recording and/or controlling system which may be of the type shown, described and claimed in application Serial No. 421,173 filed by W. P. Wills on December 1, 1941, now Patent No. 2,423,540 of July 8, 1947. In Fig. 1 the reference numeral 10 designates a thermocouple responding to a condition such as a temperature condition within a furnace and which produces a D. C. or steady potential which corresponds directly with the temperature condition existing within the furnace. This D. C. potential produced by the thermocouple 10 is opposed by a D. C. or steady potential produced by a potentiometer circuit arrangement designated generally at 11 and including a slidewire 12.

The differential D. C. or steady current produced by the opposed steady potentials is controlled by a vibrator generally designated at 13 and is applied to a transformer 14 to produce a fluctuating or alternating potential across the secondary of the transformer 14 which is of one phase or of opposite phase depending upon the direction of unbalance of the potentiometric circuit. This fluctuating or alternating potential across the secondary of the transformer 14 is amplified by an amplifier generally designated at 15 and the current output of the amplifier 15 is applied to a reversible electrical motor generally designated at 16. The reversible electric motor 16 operates to position a contact 17 along the slidewire 12. The electric motor 16 in addition to operating the contact 17 along the slidewire 12 may also position indicating and/or controlling means for indicating and/or controlling the temperature at the thermocouple 10, and in addition, may operate control apparatus for controlling a condition such as the temperature affecting the thermocouple 10. The contact 17 and the indicating, recording and/or controlling mechanism assume positions corresponding to the temperature condition existing within the furnace and to which the thermocouple 10 responds.

The potentiometer circuit arrangement includes a battery 18 and a standardizing resistance 19 for applying a D. C. or steady potential across the slidewire 12 which is in opposition to the D. C. or steady potential produced by the thermocouple 10. When the contact 17 is moved to the right as shown in Fig. 1, the potential at contact 17 is increased and when the contact 17 is moved to the left it is decreased.

The vibrator 13, as diagrammatically shown in Fig. 1, includes a vibrating reed 21 carried by a support 22. The vibrating reed 21 carries a pair of contacts 23 and 24 which are adapted to engage and disengage contacts 25 and 26, respectively, upon movement of the vibrating reed. When the vibrating reed 21 is stationary and in the middle position, contacts 23 and 24 engage the contacts 25 and 26, respectively, and as the vibrating reed is operated, one and then the other contact 23 and 24 disengage their respectively associated contacts 25 and 26. The contacts may be resiliently mounted to provide this operation. The vibrator 13 includes a coil 27 for operating the vibrating reed. Power is supplied to the coil 27 by means of a transformer 30 having a secondary 31 connected to the coil 27 and a primary 32 connected across line wires 33 and 34 leading from some source of alternating potential and current, not shown.

The transformer 14 includes a pair of primaries 37 and 38 and a secondary 39, the latter of which is connected to the amplifier 15. The upper end of the primary 37 is connected to the contact 26 and the lower end of the primary 38 is connected to the contact 25. The adjacent ends of the primaries 37 and 38 are connected together and to the positive terminal element of the thermocouple 10. The negative terminal of the thermocouple 10 is connected to the left end of the slidewire 12 and the contact 17 engaging the slidewire 12 is connected to the vibrating reed 21.

The reversible electric motor 16 illustrated is an induction motor of the rotating field type having a rotor 40 provided with conductor bars and a power winding 41 which is connected in series with a condenser 42 across the line wires 33 and 34. The condenser 42 is so selected with respect to the field winding 41 as to produce a resonant circuit to cause the current flow through the power winding 41 to be approximately in phase with the alternating potential of the line wires 33 and 34 while permitting the alternating voltage across the power winding 41 to lead the current by substantially 90°. The reversible electric motor 16 also includes a control winding 43 which is connected to the output terminals of the amplifier 15. A condenser 44 is connected in parallel with the control winding 43 to provide a resonant circuit so that the alternating or fluctuating potential across the control winding 43 leads the current through the control winding 43 by substantially 90°. Power is supplied to the amplifier 15 from the line wires 33 and 34 by wires 46 and 47, respectively. Since the amplifier 15 is disclosed and described in detail in the above referred to W. P. Wills patent, and the details thereof form no part of the present invention, a further description herein of the amplifier 15 is not considered necessary.

Assume now that during the first half cycle of the alternating potential applied to the line wires 33 and 34 the potential of the wire 33 is positive with respect to the potential of the wire 34 and that during the second half cycle the opposite condition is true. Assume also that during the first half cycle the vibrating reed 21 is moved to the right to increase the pressure of engagement of the contact 24 and the contact 26 and to cause the contact 23 to disengage the contact 25 and that during the second half cycle the vibrating reed 21 is moved to the left to cause the contact 23 to engage the contact 25 and the contact 24 to disengage the contact 26. When the potentiometer circuit is balanced, that is, when the contact 17 is at a position corresponding to the value of the temperature condition within the furnace so that the potential of the contact 17 is equal to that of the positive element of the thermocouple 10, no current flows in the potentiometer circuit, and therefore, no fluctuating or alternating potential is produced across the secondary 39 of the transformer 14. Under these conditions, the current flow through the control winding 43 of the reversible electric motor 16 is relatively uniform or steady and the reversible electric motor 16 remains stationary.

Assume now that the temperature within the furnace increases to cause the potential of the positive element of the thermocouple 10 to increase with respect to the potential of the contact 17. During the first half cycle of the alternating source this unbalanced current will flow upwardly through the primary 37 and through contacts 26 and 24 and through vibrating reed 21 to cause the upper end of the secondary 39 of the transformer 14 to become positive with respect to the lower end. During the second half cycle this unbalanced current will flow downwardly through the transformer primary 38 and through contacts 25 and 23 and vibrating reed 21 to cause the upper end of the secondary 39 to become negative with respect to the potential of the lower end. Accordingly, a fluctuating or alternating potential is produced across the secondary 39 to cause the potential of the upper end of the secondary 39 to fluctuate in phase with the line voltage across the line wires 33 and 34. This fluctuating or alternating potential across the secondary 39 is amplified by the amplifier 15 and produces an alternating or fluctuating current flow in the control winding 43 which leads the current flow through the power winding 41 by substantially 90°. This causes rotation of the reversible electric motor 16 in a direction to move the contact 17 to the right. When the contact 17 is moved sufficiently far to the right so that the potential thereof corresponds to the potential of the positive element of the thermocouple 10, the potentiometer circuit becomes balanced and rotation of the reversible electric motor 16 is stopped. The contact 17, therefore, assumes a position which is representative of the temperature condition then existing within the furnace.

Assume now that the temperature within the furnace decreases so that the potential of the positive element of the thermocouple 10 becomes less than the potential of the contact 17. During the first half cycle current flows through the vibrating reed 21 and contacts 24 and 26 downwardly through the primary 37 to cause the upper end of the secondary 39 to become negative with respect to the lower end. During the second half cycle current flows through the vibrating reed 21 and contacts 23 and 25 upwardly through the primary 38 to cause the upper end of secondary 39 to be positive with respect to the lower end. Accordingly, an alternating or fluctuating potential is produced across the secondary 39 to cause the potential of the upper end thereof to alternate or fluctuate 180° out of phase with the potential supplied by the line wires 33 and 34. This alternating or fluctuating potential across the secondary 39 is amplified by the amplifier 15 to produce a current flow through the control winding 43 of the reversible motor 16 which lags the current flow through the power winding 41 by substantially 90°. This causes the reversible motor 16 to operate in the opposite direction to move the contact 17 to the left to decrease the potential thereof. When the contact 17 is moved sufficiently far to the left so that the potential thereof corresponds to the potential of the positive terminal of the thermocouple 10, the potentiometric circuit becomes balanced and operation of the reversible electric motor 16 is stopped.

The successful operation of the above described system disclosed in Fig. 1 is dependent upon proper synchronization of the vibrator 13 with respect to the alternations of the voltage supplied by the line wires 33 and 34. In other words, it is necessary always to cause the vibrating reed 21 to move to the right during the first half cycle when the potential of the line wire 33 is positive with respect to the potential of the line wire 34, and to cause the vibrating reed 21 to move to the left during the second half cycle when the potential of the line wire 33 is negative with respect to the potential of the line wire 34.

Figure 3:
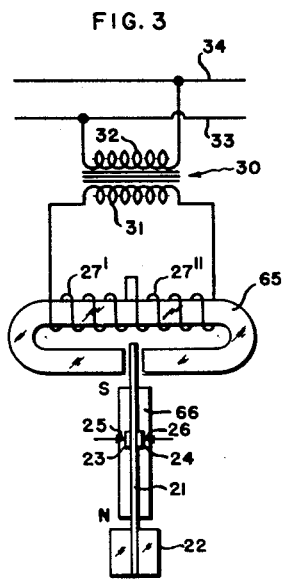

Figs. 2, 3 and 4 disclose schematically three different types of vibrators which are properly synchronized to perform in the desired manner.

Referring now to Fig. 2, the vibrator 13, in addition to including the vibrating reed 21 and contacts 23, 24, 25 and 26, also includes iron cores 50 and 51 disposed on opposite sides of the vibrating reed 21. The coil 27 comprises a coil 27' associated with the iron core 50 and a coil 27" associated with the iron core 51. When the coil 27' is energized, a magnetic field is produced in the core 50 which attracts the reed 21 to the left to cause the contacts 23 and 25 to engage and the contacts 24 and 26 to disengage. When the coil 27" is energized, a magnetic field is produced in the core 51 to attract the reed 21 to the right to cause the contacts 24 and 26 to engage and the contacts 23 and 25 to disengage.

The coils 27' and 27" are controlled by a rectifier arrangement including the transformer 30 which is provided with a pair of secondary windings 31' and 31" and a rectifying tube 53 having a pair of plates 54 and 55, a pair of cathodes 56 and 57, and a pair of cathode heaters 58 and 59. The cathode heaters 58 and 59 may be supplied with energy from any suitable source, not shown. The plate 54 is connected to the right end of the transformer secondary winding 31' and the left end of the secondary winding 31' is connected to the left end of the coil 27' of the vibrator. The plate 55 is connected to the left end of the transformer secondary winding 31" and the right end thereof is connected to the right end of the coil 27" of the vibrator. The adjacent ends of the coils 27' and 27" are connected together and through a resistance 60 to the cathodes 56 and 57 which also are connected together. The rectifier arrangement is therefore a full wave rectifier for producing a substantially steady D. C. potential across the resistance 60 which may be utilized, if so desired, for supplying D. C. current to the amplifier 15.

During the first half cycle of the alternating potential applied to the line wires 33 and 34, it is assumed that the left ends of the transformer secondary windings 31' and 31" are positive. Current will then flow from the left end of the secondary winding 31" through the plate 55, cathode 57, resistance 60 and coil 27" back to the right end of the secondary winding 31". This moves the vibrating reed 21 to the right to cause the contacts 24 and 26 to engage and the contacts 23 and 25 to disengage. During the first half cycle, no current flows through the coil 27', and consequently, the vibrating reed 21 is positively attracted to the right. During the second half cycle the right ends of the transformer secondary windings 31' and 31" are positive. During the second half cycle current flows from the right end of the secondary 31' through the plate 54, cathode 56, resistance 60 and coil 27' back to the left end of the secondary 31'. This causes the vibrating reed 21 to be attracted to the left to cause the contacts 23 and 25 to engage and the contacts 24 and 26 to disengage. During the second half cycle no current flows through the coil 27", and therefore, the vibrating reed 21 is positively attracted to the left. By virtue of this rectifying arrangement as shown in Fig. 2, the operation of the vibrating reed 21 is at all times positively synchronized with respect to the alternations of the potentials of the line wires 33 and 34. The arrangement of Fig. 2 is shown, described and claimed in the application Serial No. 421,174, filed by Walter P. Wills on December 1, 1941, now Patent No. 2,375,158 of May 1, 1945. Therefore, a further description of Fig. 2 is not considered necessary.

Fig. 3 shows another way of synchronizing the operation of the vibrator so that the vibrating reed 21 moves to the right during the first half cycle and to the left during the second half cycle. Coils 27' and 27" are connected in series to form a substantially continuous coil which receives current from the secondary 31 of the transformer 30. A single coil may be used to equal advantage. The serially connected coils 27' and 27" are mounted on a core 65 and the upper end of the vibrating reed 21 is controlled by the flux passing through the core 65. A permanent magnet 66 having a south pole adjacent the movable end of the reed 21 and a north pole at the other end is utilized for magnetizing the vibrating reed 21 so that the upper end of the vibrating reed 21, as shown in Fig. 3, is always a south pole.

During the first half cycle of the supply line voltage, the left end of the transformer secondary 31 becomes positive with respect to the right end to cause flux to flow in the core 65 to make that portion of the core 65 to the right of the vibrating reed 21 a north pole and that portion to the left a south pole. The north pole of the core 65 attracts the south pole of the reed 21 and the south pole of the core 65 repels the south pole of the reed 21 to move the reed to the right to cause the contact 24 to engage the contact 26 and the contact 23 to disengage the contact 25. During the second half cycle the right end of the secondary 31 of the transformer becomes positive with respect to the left end whereby the flux flow through the core 65 is reversed. The left side of the core 65 then becomes a north pole and the right side then becomes a south pole, and these north and south poles act in conjunction with the south pole of the reed 21 to move the reed 21 to the left to cause the contact 23 to engage the contact 25 and the contact 24 to disengage the contact 26. Consequently, the magnet 66 which magnetizes the reed 21 insures that the reed 21 will vibrate in synchronism with the supply voltage. Instead of utilizing the permanent magnet 66, the reed 21 itself may be permanently magnetized for obtaining the synchronizing operation.

In Fig. 4 a permanent magnet 70 and an armature 71 carried by the reed 21 are utilized for synchronizing the operation of the vibrating reed 21. Here the coil 27 surrounds the armature 71 carried by the reed 21. The permanent magnet 70 is so arranged that the portion thereof to the left of the armature 71 is a north pole and the portion thereof to the right is a south pole. During the first half cycle the left end of the secondary 31 of the transformer becomes positive with respect to the right end which causes the upper end of the armature 71 to become a north pole and the lower end a south pole. The north pole of the armature 71 during the first half cycle cooperates with the north and south poles of the permanent magnet 70 to move the vibrating reed 21 to the right to cause the contact 24 to engage the contact 26 and the contact 23 to disengage the contact 25. In the second half cycle, the right end of the secondary 31 becomes positive with respect to the left end which, in turn, causes the upper end of the armature 71 to become a south pole and the lower end a north pole. The south pole of the upper end of the armature 71 cooperates with the north and south poles of the permanent magnet 70 to move the vibrating reed 21 to the left to cause the contact 23 to engage the contact 25 and the contact 24 to disengage the contact 26.

Inasmuch as the vibrators disclosed herein have particular utility in connection with a potentiometer system as illustrated in Fig. 1 which requires the switching of very small voltages, the details of construction of the various vibrators are extremely important. While the vibrators of this application have been specifically devised for use in the potentiometer system of the type shown in Fig. 1, they may, of course, be utilized with some modification for switching larger voltages.

Figs. 5 and 6 illustrate in more detail the vibrator shown diagrammatically in Fig. 2. The laminated cores 50 and 51 carrying the coils 27' and 27'', respectively, are secured to a base 75 preferably made of insulating material by means of a plate 76 and screws 77. Terminals 78 carried by the base 75 are utilized for facilitating connections to the coils 27' and 27''. An auxiliary assembly comprising members 80 and 81 is secured to the base 75 by means of screws 82. The various component parts of the auxiliary assembly are secured together by a screw 83 and a nut 93, which parts comprise a washer 84, an insulating washer 85, connecting tab 86, member 81, insulating washer 87, connecting tab 88, vibrating reed 21, insulating washer 89, member 80, connecting tab 90, insulating washer 91, and washer 92. By tightening the nut 93 these various component parts of the auxiliary assembly may be securely clamped together.

Spring members 94 and 95 which carry the contacts 23 and 24, respectively, are secured to the vibrating reed 21 by a rivet 96. Outward movement of the spring members 94 and 95 is limited by the stops 97 and 98, respectively, which stops are rigidly secured to the reed 21. The spring members 94 and 95 are channeled part way for rigidity. Preferably, the contacts 23 and 24 are made of palladium silver. The contacts 25 and 26 are shown to comprise screws carried by the members 80 and 81, those screws being carried in a slot 99 formed in the members 80 and 81. After the screws 25 and 26 are properly adjusted with respect to the contacts 23 and 24, screws 100 are tightened to securely clamp the contact screws 25 and 26 in place. Preferably, the ends of the contact screws 25 and 26 carry a thin plate of iridium platinum for engagement with the palladium silver contacts 23 and 24. During operation of the vibrator a pronounced wiping action takes place at the contacts.

The contacts 25 and 26 are normally adjusted so that when the reed 21 is in the middle position contacts 23 and 24 engage contacts 25 and 26, respectively. When the vibrating reed 21 is moved to the right, the contact 23 disengages the contact 25 and when the vibrating reed moves to the left, the contact 24 disengages the contact 26. Such an adjustment is desirable when the vibrator is utilized in a potentiometer system of the type shown in Fig. 1 so that the D. C. potential of the potentiometer circuit is never entirely interrupted but is applied either to one or the other of the primaries 37 and 38 of the transformer 14 of Fig. 1. By reason of this adjustment of the contacts 25 and 26 wear at the contacts will not appreciably affect the operation of the potentiometer system.

By making the contacts of different materials, particularly of the materials specified, the life of the contacts is materially increased. In addition, a clean condition at the point of contact is maintained at all times and the performance of the contacts remains substantially uniform over long periods of operation. When two hard contacting surfaces are used, it has been found that each tends to wear the other and that a hard granular residue appears between the surfaces. This granular residue remains between the contacts even in the presence of a strong wiping action thereby increasing the wear of both contact surfaces. This granular residue also provides high contact resistance of an unstable character which is not suitable for switching small voltages with any degree of precision. When two relatively soft contacting surfaces are used, it has been found that there is appreciable wear and severe cutting or scoring of the contact surfaces.

These difficulties are overcome by the use of different materials for the contacts. The iridium platinum surface of one of the contacts is highly polished to present an extremely smooth and hard surface to the mating contact. The palladium silver surface of the other contact is somewhat softer and, after a number of engagements with the hard and shiny iridium platinum surface, assumes a similar polished finish which decreases wear to a minimum thereby promoting long life of the contacts. The residue which is produced by the contacting of the contacts emanates primarily from the softer contact surface and instead of being granular and abrasive in form is relatively plastic. The wiping action of the contacts immediately removes the residue from between the contacting surfaces which also promotes long life of the contacts as well as self cleaning of the contacts for optimum performance. Any wear that does take place occurs at the palladium silver surface and does not destroy the reference surface of the iridium platinum contact. When the contacts are originally adjusted, the iridium platinum surfaces form the reference surfaces. The symmetry of adjustment of the two sets of contacts, therefore, remains the same over long periods of operation to provide uniform operation.

Figure 7:
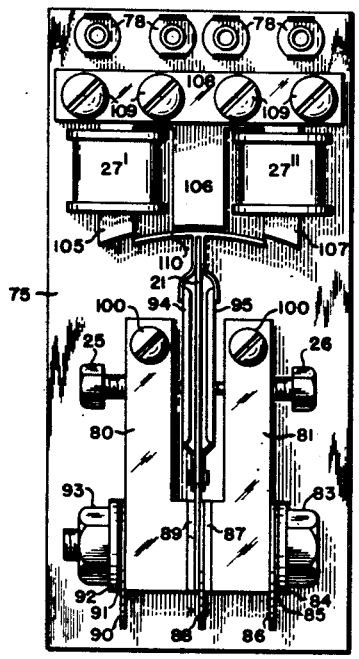
Fig. 7 is a front elevational view of a modification of Fig. 5.

Figure 7 illustrates a modification of the arrangement of Figs. 5 and 6. Instead of the laminated cores 50 and 51 of Fig. 5, Fig. 7 utilizes a single laminated core structure having legs 105, 106 and 107, the coil 27' being mounted on the leg 105 and the coil 27" being mounted on the leg 107. The laminated core structure is secured to the base 75 by means of a plate 108 and screws 109. The auxiliary assembly including the members 80 and 81 is the same as the auxiliary assembly of Fig. 5 and like reference numbers for like parts have therefore been employed. The vibrating reed 21 of Fig. 7 carries a curved armature 110 which cooperates with the ends of the legs 105, 106 and 107. The armature 110 also acts as stops for restraining the movement of the spring members 94 and 95. When the coil 27" is energized the armature 110 and the vibrating reed 21 are moved to the right, and when coil 27' is energized the armature 110 and the reed 21 are moved to the left.

Fig. 8 shows a further modification of Fig. 5 and is exactly the same as Fig. 5 with the exception of the members which carry the contacts 23 and 24. In Fig. 8 the contacts 23 and 24 are carried by spring members 112 and 113 which are suitably riveted to the vibrating reed 21 by rivets 114. The operation of the contacts of Fig. 8 is substantially the same as the operation of the contacts of Fig. 5.

Fig. 9 illustrates in more detail the vibrator diagrammatically shown in Fig. 3. In Fig. 9 the laminated core 65 is secured to the base 75 by means of a plate 115 and screws 116. The core 65 carries the coils 27' and 27" and suitable terminals 78 carried by base 75 may also be utilized for facilitating connections to the coils 27' and 27". As pointed out above, a single coil may be utilized in lieu of the two coils 27' and 27" shown in Fig. 9. The auxiliary assembly including the members 80 and 81 is for all intents and purposes the same as the auxiliary assembly shown in Figs. 5 and 7, and therefore, a further description of this auxiliary assembly is not considered necessary. The vibrating reed 21 carries a pair of relatively short, stiff spring members 117 and 118 which are suitably secured to the vibrating reed 21 by rivets 119. The contacts 23 and 24 are carried by the spring members 117 and 118, respectively, and cooperate with the stationary contacts 25 and 26. The operation of the contacts of Fig. 9 is substantially the same as the operation of the contacts of Fig. 5. The permanent magnet 66 is imbedded in the base 75 immediately adjacent the vibrating reed 21 so that the permanent magnet 66 operates to polarize the vibrating reed 21 to perform the operation outlined above in connection with Fig. 3. As pointed out above, the same operation could be obtained by magnetizing the vibrating reed 21 and eliminating the magnet 66.

Fig. 10 shows a modification of the arrangement of Fig. 9, the main distinction being the construction of the members which carry the contacts 23 and 24. This construction is substantially the same as the construction of Figs. 5 and 7. Here, spring members 94 and 95 carrying the contacts 23 and 24 are secured to the vibrating reed 21 by the rivet 96. The armature 121 which is polarized by the magnet 66, or which may be permanently magnetized, cooperates with the core 65 for synchronizing the operation of the vibrator. Armature 121 also operates as a stop for the spring members 94 and 95.

The spring members carrying the contacts 23 and 24 shown in Fig. 9 could be utilized in Figs. 5 and 7 and also the spring members carrying the contacts 23 and 24 shown in Fig. 8 could be utilized in the arrangement of Fig. 9.

All of the above described vibrators may be provided with suitable covers to protect them from dirt and corrosive atmospheres. Such covers, furthermore, may desirably be made of a suitable material such as cold rolled steel for shielding the contacts 23—26 and the conducting leads thereto from extraneous magnetic and electrical fields which may be present in the vicinity. Stray electrical and magnetic fields in the vicinity of the vibrator tend to cause the introduction of alternating or fluctuating currents into the thermocouple and potentiometric measuring circuit 11, as seen in Fig. 1, and thereby tend to render the operation of the apparatus unstable and erratic. In particular, such extraneous fluctuating or alternating currents in the thermocouple and potentiometer circuit introduce false balance points into the potentiometer and also cause erratic operation of the potentiometric rebalancing motive structure. The provision of a shielding cover for the vibrators, accordingly, materially improves the operation of the potentiometric measuring system by reducing or eliminating entirely the tendency for stray fluctuating or alternating currents to be introduced into the thermocouple and potentiometric circuit.

In the vibrators described in Figs. 5–10 the connection of the leads to the energizing coils at one end of the base 75 and the connection of the leads to the contacts 23—26 at the other end of the base 75 effects a further reduction in the pick-up of stray fluctuating or alternating currents in the thermocouple and potentiometric circuit. This result is obtained because of the separation of the coil energizing leads and the contact leads as much as possible. Such further reduction in the pick-up of stray fluctuating or alternating currents in the thermocouple and potentiometric circuit is advantageous in that it permits the measurement of smaller D. C. voltages with greater accuracy and precision.

In Fig. 11, I have illustrated, more or less diagrammatically, a preferred embodiment of the vibrator shown in Figs. 5 and 6. The vibrator of Fig. 11 is provided with a cover 122, shown in section, for shielding the vibrator from dirt and corrosive atmospheres and also for electrically and magnetically shielding the vibrator contacts and the conducting leads thereto from extraneous electrical and magnetic fields which may be present in the vicinity. The cover 122 is provided with a circular opening in the top thereof in which a socket 123 which may be made of rubber or a plastic or other suitable material is mounted. The socket 123 is provided with three terminals which are electrically connected to the contacts 25, 23—24, and 26, respectively, of the vibrator and are provided to facilitate connection of the contacts 23—26 to the potentiometric measuring circuit 11 by means of a plug 124 and a cable 124' connected thereto. The contacts 23 and 24, as shown, are connected together and to one of the terminals of socket 123. The contacts 25 and 26 are each connected to respective terminals of socket 123. For convenience of illustration, the spring members carrying the contacts 23 and 24 in Fig. 11 have been illustrated as of the type shown in Fig. 9, but it will be understood that spring members of the type shown in Fig. 5 or 8 may also be utilized in the arrangement of Fig. 11 if so desired.

The vibrator of Fig. 11 is also provided with a base formed of insulating material and shown at 125 for electrically connecting the energizing coils 27' and 27" to the transformer 30. Secured to the base 125 are four terminals 126, 127, 128 and 129 which adapt the vibrator for mounting in a conventional tube socket. The electrical connections to the coils 27' and 27" from the transformer secondary windings 31' and 31", respectively, as seen in Fig. 2, are made through the terminals 126—129. Thus, the terminals of the energizing coil 27' are connected to the prongs 128 and 129, and the terminals of the coil 27" are connected to the prongs 126 and 127. The base plate 75 is secured to the base 125 in any convenient manner, and for example, may be secured thereto by means of screws not shown.

The operating parts of the vibrator mechanism preferably are sealed within the cover 122, and to this end, a gasket 130 which may be made of cork neoprene is provided for hermetically sealing the operating parts within the cover 122. A clamping ring 131 secures cover 122 and gasket 130 to the base 125.

An advantageous feature of this arrangement is that the connecting leads from the potentiometric circuit 11, as seen in Fig. 1, to the contacts 23—26 of the vibrator are brought in from the upper end of the vibrator, and the connecting leads to the energizing coils 27' and 27" are brought in from the bottom of the vibrator. This construction, similarly to the vibrators of Figs. 5-10, serves to separate the two sets of connecting leads as much as possible and, in conjunction with the electrical and magnetic shielding provided by cover 122, reduces the tendency of pick-up of fluctuating or alternating currents in the thermocouple and potentiometric measuring circuit from the energizing coils 27' and 27" and the connecting leads to the latter elements. In this manner the stray fluctuating and alternating currents which may be introduced into the thermocouple and potentiometric circuit are reduced to an exceedingly low level, thus making possible the measurement of exceedingly small D. C. potentials with great accuracy and precision and with little or no interference due to pick-up from the power or energizing leads to the coils 27' and 27" or from the coils themselves.

Figs. 12, 13 and 14 illustrate, more or less diagrammatically, a preferred embodiment of the vibrator schematically shown in Fig. 4. I now consider the vibrator shown in Figs. 12, 13 and 14 to be a preferred embodiment of the present invention. Referring more specifically to Figs. 12, 13 and 14, a base preferably formed of insulating material is shown at 125, and secured to this base, are four terminal prongs 126, 127, 128 and 129 which adapt the vibrator for mounting in a conventional tube socket. The electrical connections to the contacts of the vibrator are made, in this embodiment of my invention, through three of these prongs, namely, prongs 126, 127 and 128. The fourth prong 129 provides a ground connection for the supporting plate 132 and the associated parts electrically connected to plate 132. The supporting plate 132 is secured to the base 125 by means of long screws 133. The magnet 70 is carried by the plate 132, and this magnet may be formed of aluminum, nickel, and cobalt in proportions commonly termed "Alnico." Magnet 70 is preferably tapered at its poles for the purpose of concentrating the flux of the magnet at the region adjacent the end of armature 71. The coil 27, formed in a Bakelite mold, extends into the opening of the magnet 70 and is held in place by a bracket 139. The bracket 139 is preferably formed of soft steel and is provided with ears 140 for mounting purposes. Screws 141 extend through the ears 140 and through suitable openings in the magnet 70 for holding the bracket 139, the coil 27 and the magnet 70 in place on the plate 132. The bracket 139 is provided with relatively short ears 142 and relatively long ears 143 for clamping the coil 27 rigidly in place. The relatively long ears 143, cooperating with the remainder of the bracket 139, operate to provide a flux path for the flux produced by the coil 27 and to shield the rest of the vibrator from magnetic strays produced by the coil 27. The plate 132 is provided with openings 144 for accommodating wires which connect the coil 27 to the terminals 180 and 181. The terminals 180 and 181 are mounted in the top of a cover 122 which may be identical to the cover of Fig. 11 and preferably are secured in the top of cover 122 by means of rubber grommets 182 and 183, respectively. The manner of securing the rubber grommets in the top of the cover 122 so as to provide a seal will be explained hereinafter.

A bifurcated stud 148 having a screw threaded extension 149 extending through an opening in the plate 132 is held in place on the plate 132 by a nut 150 cooperating with the screw threaded extension 149. The bifurcated end of the stud 148 includes a stacking which is held in place on the bifurcated stud 148 by means of a screw 151 and a cooperating nut 152. The stacking includes an insulating washer 153, connecting tab 154, a spring contact member 155, a spring stop 156, an insulating washer 157, a connecting tab 158, the vibrating reed 21, an insulating washer 159, a spring stop 160, a spring contact member 161, a connecting tab 162, and an insulating washer 163. These various parts are all clamped in the bifurcation of the stud 148 by the screw 151 and the nut 152. A sleeve formed of insulating material mounted on the screw 151 insulates the stacking from the screw 151. The insulating washers 153, 157, 159 and 163 are preferably made of mica. The spring contact members 155 and 161 are preferably made of tempered beryllium copper. The spring stops 156 and 160 are preferably made of spring brass and the vibrating reed 21 is preferably made of tempered beryllium copper. The connecting tabs 154, 158 and 162 are preferably made of cadmium plated copper and these connecting tabs are turned over at the ends to facilitate electrical connections. The tab 154 acts as a terminal for the spring contact member 155, the tab 158 acts as a terminal for the vibrating reed 21, and the tab 162 acts as a terminal for the spring contact member 161. The tabs 162, 158 and 154 are repectively connected to the terminal prongs 126, 127 and 128. The spring stops 156 and 160 are provided with a circular opening 167 and a rectangular opening 166. The upper ends of the spring contact members 155 and 161 are channeled as shown at 168 in Fig. 13 and the contacts 26 and 25 extend through openings in the spring contact members 155 and 161 and are held in place in the channel. When the contacts 26 and 25 are suitably positioned in the channels they are soldered in place, the soldered connection between the contacts and the channels forming a rigid and suitable mounting for the contacts 26 and 25. The channel arrangement 168 also limits all pivotal or bending movement in the spring contact members 155 and 161 to the flattened portion below the channel. The vibrating reed 21 carries the contacts 23 and 24 which engage and disengage the contacts 25 and 26 carried by the spring contact members 161 and 155, respectively. The contacts 25 and 26 extend through the rectangular openings 166 of the spring stops 156 and 160.

A pair of bifurcated studs 170 and 171 are riveted to the plate 132 and screw threadedly mounted in the bifurcations of these studs are adjustable stops 172 and 173, respectively. Preferably, these adjustable stops 172 and 173 are formed of stainless steel having glass inserts fused in the ends which engage the stops 156 and 160 and are provided to insulate the stops 156 and 160 from the grounded portion of the structure. Screws 174 and 175 may be tightened for clamping the screws 172 and 173 in their adjustable positions. The upper end of the reed 21 carries the armature 71 which may be formed of "Armco" iron or Swedish steel.

The construction for supporting the terminals 180 and 181 mounted in the upper end of the cover 122 will now be described. This construction may best be seen by referring to Figs. 13 and 14 and comprises a bridge member 184 which is composed of an insulating material and is supported by means of a pair of brass mounting sleeves 185 and 186. The screws 133 extend through openings provided in the bridge member 184 and also extend through the mounting sleeves 185 and 186 to tapped holes in the base 125 provided to receive the screws 133. The upper ends of the mounting sleeves 185 and 186 provide shoulders for supporting the bridge member 184 and similarly the lower ends of the mounting sleeves provide shoulders for engaging the base 125. When the screws 133 are screwed into the holes in base 125 and are tightened, this arrangement provides a very sturdy structure, particularly when the ends of the mounting sleeves 185 and 186 are squared off as shown.

Supported by the bridge member 184 are a pair of posts 187 and 188 which are provided at their lower ends with shoulders which engage the upper surface of the bridge member 184. The ends of the posts 187 and 188 which extend through the bridge member 184 are riveted over on the lower side of the bridge member 184 as shown to rigidly secure the posts 187 and 188 to the bridge 184. The upper ends of the posts 187 and 188 are reduced in cross-section to provide shoulders which engage the lower surfaces of the grommets 182 and 183. The ends of posts 187 and 188 which extend through the grommets are screw threaded to accommodate nuts 189 and 190, which desirably may be hexagonal nuts. Nuts 189 and 190 are tightened against shoulders provided on the posts 187 and 188 to compress and securely hold the grommets 183 and 182 against the associated shoulders of the posts 187 and 188, respectively, to thereby provide a seal for the openings in the upper end of the cover 122 which accommodate the posts and the grommets.

Tabs 191 and 192 are securely connected to the lower ends of the posts 187 and 188, respectively, and are provided for facilitating connections of the terminals of the coil 27 to the posts 187 and 188 and thereby to the terminals 181 and 180.

By virtue of this construction, the terminals 180 and 181 may be rugged and sturdy and may be handled in a relatively rough manner when the connection of the terminals of the energizing coil 27 to the transformer 30 and thereby to the alternating current supply lines 33 and 34 is made without adversely affecting the operation of the vibrator. This advantageous result is obtained because the mounting means for the terminals 180 and 181 are independent of the mounting means including plate 132 for the vibrating contacts 23—26 and coil 27.

It will be noted that the structure described in Figs. 12-14 differs from that disclosed in Fig. 11 in that in Fig. 11 the leads taken out at the upper end of the vibrator are the leads to the vibrator contacts 23—26 whereas in the form of Figs. 12-14 the leads taken out at the upper end are the leads to the energizing coil 27. In Fig. 11 the leads taken out at the bottom end are the leads to the energizing coils 27' and 27" while the leads taken out at the bottom in the form of Figs. 12-14 are the leads to the vibrator contacts 23—26. The apparatus form shown in Fig. 11 and that shown in Figs. 12-14, however, have in common the electrical and magnetic shielding of the contacts, and in addition the separation of the connecting leads to the energizing coil 27 and the connecting leads to the vibrator contacts 23—26 as far as possible. This separation together with the shielding action provided by plate 132 reduces to a material degree the pick-up of stray fluctuating or alternating currents in the thermocouple and potentiometric circuit and thereby makes possible the measurement of smaller D. C. potentials with greater accuracy and precision.

With the apparatus form of Figs. 12-14, as the vibrating reed 21 moves to the right, contact 23 disengages contact 25, and contact 24 causes the channel portion 168 of the spring contact member 155 to disengage the spring stop 156. When the vibrating reed 21 moves to the left, the same operation in reverse order takes place. The channel portion 168 has substantially the same contact surface with the spring stop 156 as the surface of the contact 26 with the contact 24 so that wear on the contact 26 and on the channel portion 168 will be substantially the same. The wear on the channel portion 168, accordingly, compensates for the wear on the contact 26 so that the contacts 24 and 26 keep the same relative positions. By virtue of this construction it has been found that readjustment of the contact 26 with respect to the contact 24, even after a long period of operation, is not necessary. The same is true for the contacts 23 and 25 and the channel portion 168 of the spring contact member 161. Due to the fact that bending of the spring contact members 155 and 161 must take place below the channel portion 168, the movement of the contacts 25 and 26 when engaged by the contacts 23 and 24 is limited to an arc whereby reliable operation is assured and a good wiping action at the contacts is obtained. Preferably, the contacts 23 and 24 are formed of iridium platinum and the contacts 25 and 26 are formed of palladium silver to provide improved operation as pointed out above in connection with Fig. 5.

During the operation of the vibrator of Figs. 12-14, the armature 71 cooperates with the concentrated flux at the poles of the magnet 70. Changing of the upper end of the armature 71 from a north pole to a south pole by the operation of the coil 27 is enhanced by the ears 143 of the bracket 139, and the bracket 139 itself and this taken in conjunction with the concentrated flux of the magnet provides a very efficient mode of operation.

As in the vibrator of Fig. 11, a gasket 130, which may be made of cork neoprene, is preferably provided for hermetically sealing the operating parts of the vibrator within the cover 122. A clamping ring 131 secures the cover 122 and the gasket 130 to the base 125.

While, in accordance with the provisions of the statutes, I have illustrated and described the best forms of this invention now known to me, it will be apparent to those skilled in the art that changes may be made in the form of the apparatus disclosed without departing from the spirit of this invention as set forth in the appended claims, and that is some cases certain features of my invention may sometimes be used to advantage without a corresponding use of other features.

Having now described my invention, what I claim as new and desire to secure by Letters Patent is as follows:

1. Switching means comprising, in combination, a support, a resilient reed fixed at one end to said support to project therefrom for vibration of the projecting free portion of the reed, electromagnetic means to vibrate said reed, contact means mounted on said support and disposed to be engaged by said reed, a cover for said reed, said electromagnetic means, and said contact means, terminal means mounted on said cover and extending through the top thereof, terminal means mounted on said support at a position remote from said first mentioned terminal means, a connection from said reed and contact means to said first mentioned terminal means whereby said first mentioned terminal means provides a connection from said reed and contact means to a circuit to be controlled, and a connection from said electromagnetic means to said second mentioned terminal means whereby said second mentioned terminal means provides a connection from said electromagnetic means to an energizing source of fluctuating electric current.

2. Switching means comprising, in combination, a support, a resilient reed fixed at one end to said support to project therefrom for vibration of the projecting free portion of the reed, electromagnetic means to vibrate said reed, contact means mounted on said support and disposed to be engaged by said reed, a cover for said reed, said electromagnetic means, and said contact means, a socket provided with terminals mounted in the top of said cover, terminal means mounted on said support at a position remote from said socket, a connection from said reed and contact means to the terminals of said socket, means including a separable male plug associated with said socket to provide a connection from said reed and contact means to a circuit to be controlled, and a connection from said electromagnetic means to said terminal means whereby said terminal means provides a connection from said electromagnetic means to an energizing source of fluctuating electric current.

3. Switching means comprising, in combination, a support, a resilient reed fixed at one end to said support to project therefrom for vibration of the projecting free portion of the reed, electromagnetic means to vibrate said reed, contact means mounted on said support and disposed to be engaged by said reed, a cover for said reed, said electromagnetic means, and said contact means, a socket provided with terminals mounted in the top of said cover, a male plug provided with terminals mounted on said support at a position remote from said socket, a connection from said reed and contact means to the terminals of said socket, means including a separable male plug associated with said socket to provide a connection from said reed and contact means to a circuit to be controlled, a connection from said electromagnetic means to the terminals of said first mentioned male plug, and means including a socket associated with said first mentioned male plug to provide a connection from said electromagnetic means to an energizing source of fluctuating electric current.

4. Switching means comprising, in combination, a male plug provided with terminals, a supporting plate mounted on said plug, a resilient reed fixed at one end to said supporting plate to project therefrom for vibration of the projecting free portion of the reed, electromagnetic means to vibrate said reed, contact means mounted on said supporting plate and disposed to be engaged by said reed, a cup-shaped cover for said supporting plate, said reed, said electromagnetic means, and said contact means, said plug being arranged to close the bottom and open end of said cover, a socket provided with terminals mounted in the top of said cover, flexible connections from said reed and contact means to the terminals of said socket, means including a separable male plug associated with said socket to provide a connection from said reed and contact means to a circuit to be controlled, a connection from said electromagnetic means to the terminals of said first mentioned male plug, and means including a socket associated with said first mentioned male plug to provide a connection from said electromagnetic means to an energizing source of fluctuating electric current.

5. Switching means comprising, in combination, a male plug provided with terminals, a supporting plate mounted on said plug, a resilient reed fixed at one end to said supporting plate to project therefrom for vibration of the projecting free portion of the reed, electromagnetic means to vibrate said reed, contact means mounted on said supporting plate and disposed to be engaged by said reed, a cup-shaped metallic cover for said supporting plate, said reed, said electromagnetic means, and said contact means to electrically and magnetically shield said reed and said contact means from extraneous electrical and magnetic effects and also to protect said enclosed elements from dust and corrosive atmospheres, said plug being arranged to close the bottom and open end of said cover, a socket provided with terminals mounted in the top of said cover, flexible connections from said reed and contact means to the terminals of said socket, means including a separable male plug associated with said socket to provide a connection from said reed and contact means to a circuit to be controlled, a connection from said electromagnetic means to the terminals of said first mentioned male plug, and means including a socket associated with said first mentioned male plug to provide a connection from said electromagnetic means to an energizing source of fluctuating electric current and also to provide a mounting support for said switching means.

6. Switching means comprising, in combination, a male plug provided with terminals, a supporting plate mounted on said plug, a resilient reed fixed at one end to said supporting plate to project therefrom for vibration of the projecting free portion of the reed, electromagnetic means to vibrate said reed, contact means mounted on said supporting plate and disposed to be engaged by said reed, a cup-shaped cover for said supporting plate, said reed, said electromagnetic means, and said contact means to electrically and magnetically shield said reed and said contact means from extraneous electrical and magnetic effects and also to protect said enclosed elements from dust and corrosive atmospheres, said plug being arranged to close the bottom and open end of said cover, terminal means extending through the top of said cover, connections from said reed and contact means to said terminal means, means to provide a connection from said reed and contact means to a circuit to be controlled, a connection from said electromagnetic means to the terminals of said male plug, and means including a socket associated with said male plug to provide a connection from said electromagnetic means to an energizing source of fluctuating electric current.

7. Switching means comprising, in combination, a male plug provided with terminals, a supporting plate, a pair of elongated sleeves, a bridging member, and a pair of elongated screws each extending through said bridging member, an associated one of said sleeves, and said supporting plate to accommodating tapped openings in said plug to hold said elements rigidly together, a resilient reed fixed at one end to said supporting plate for vibration of the free portion of the reed, electromagnetic means to vibrate said reed, contact means mounted on said supporting plate and disposed to be engaged by said reed, a cup-shaped cover for said supporting plate, said reed, said electromagnetic means, and said contact means to electrically and magnetically shield said reed and said contact means from extraneous electrical and magnetic effects and also to protect said enclosed elements from dust and corrosive atmospheres, said plug being arranged to close the bottom and open end of said cover, terminal means extending through the top of said cover and supported by said bridging member, connections from said electromagnetic means to said terminal means, means to provide a connection from said terminal means to a source of fluctuating electrical current, a connection from said reed and contact means to the terminals of said male plug, and a utilization circuit associated with said male plug.

8. Switching means comprising, in combination, a male plug provided with terminals, a supporting plate, a pair of elongated sleeves, an insulating bridging member, and a pair of elongated screws each extending through said bridging member, an associated one of said sleeves, and said supporting plate to accommodating tapped openings in said plug to hold said elements rigidly together, a resilient reed fixed at one end to said supporting plate for vibration of the free portion of the reed, electromagnetic means to vibrate said reed, contact means mounted on said supporting plate and disposed to be engaged by said reed, a cup-shaped cover for said supporting plate, said reed, said electromagnetic means, and said contact means to electrically and magnetically shield said reed and said contact means from extraneous electrical and magnetic effects and also to protect said enclosed elements from dust and corrosive atmospheres, said plug being arranged to close the bottom and open end of said cover, means to seal said opening, a pair of posts rigidly supported by said bridging member and extending through openings provided in the top of said cover, an insulating grommet provided in each of said openings and engaged at its lower surface by a shoulder provided on each of said posts, means engaging the upper surface of each of said grommets and abutting against a second shoulder provided on each of said posts, said shoulders being separated by such a distance that said grommets are squeezed together as required to provide a seal for the openings in the top of said cover, connections from said electromagnetic means to said posts, means to provide a connection from said posts to an energizing source of alternating electric current, a connection from said reed and contact means to the terminals of said male plug, and a utilization circuit associated with said plug.

9. Switching means comprising, in combination, a male plug provided with terminals, a supporting plate, a pair of elongated sleeves, a bridging member, and a pair of elongated screws each extending through said bridging member, an associated one of said sleeves, and said supporting plate to accommodating tapped openings in said plug to hold said elements rigidly together, a resilient reed fixed at one end to said supporting plate for vibration of the free portion of the reed, electromagnetic means to vibrate said reed, a pair of contacts mounted on said supporting plate and disposed on opposite sides of said reed to be engaged by said reed, a cup-shaped cover for said supporting plate, said reed, said electromagnetic means, and said pair of contacts to electrically and magnetically shield said pair of contacts and said reed from extraneous electrical and magnetic effects and also to protect said enclosed elements from dust and corrosive atmospheres, said plug being arranged to close the bottom and open end of cover, means to seal said opening, a pair of posts rigidly supported by said bridging member and extending through openings provided in the top of said cover, an insulating grommet provided in each of said openings and engaged at its lower surface by a shoulder provided on each of said posts, means engaging the upper surface of each of said grommets and abutting against a second shoulder provided on each of said posts, said shoulders being separated by such a distance that said grommets are squeezed together as required to provide a seal for the openings in the top of said cover, connections from said electromagnetic means to said posts, means to provide a connection from said posts to an energizing source of alternating current, a connection from said reed and said pair of contacts to the terminals of said male plug, and a utilization circuit associated with said plug.

10. Switching means comprising, in combination, a male plug provided with terminals, a supporting plate, a pair of elongated sleeves, a bridging member, and a pair of elongated screws each extending through said bridging member, an associated one of said sleeves, and said supporting plate to accommodating tapped openings in said plug to hold said elements rigidly together, a resilient reed fixed at one end to said supporting plate for vibration of the free portion of the reed, electromagnetic means to vibrate said reed, a contact mounted on said reed, a pair of contacts mounted on said supporting plate and disposed on opposite sides of said reed to be engaged by said first mentioned contact, a cup-shaped cover for said supporting plate, said reed, said electromagnetic means, and said pair of contacts to electrically and magnetically shield said contacts and said reed from extraneous electrical and magnetic effects and also to protect said enclosed elements from dust and corrosive atmospheres, said plug being arranged to close the bottom and open end of said cover, means to seal said opening, a pair of posts rigidly supported by said bridging member and extending through openings provided in the top of said cover, an insulating grommet provided in each of said openings and engaged at its lower surface by a shoulder provided on each of said posts, means engaging the upper surface of each of said grommets and abutting against a second shoulder provided on each of said posts, said shoulders being separated by such a distance that said grommets are squeezed together as required to provide a seal for the openings in the top of said cover, connections from said electromagnetic means to said posts, means to provide a connection from said posts to an energizing source of alternating current, a connection from said first mentioned contact and said pair of contacts to the terminals of said male plug, and a utilization circuit associated with said plug.

11. Switching means for regularly interrupting, in synchronism with the fluctuation of a fluctuating energizing current, the minute flow of current in a direct current measuring circuit to create in said circuit a minute pulsating unidirectional flow of current the pulsations of which are synchronized with the fluctuations of the fluctuating energizing current, comprising, in combination, a support, a resilient reed fixed at one end to said support to project therefrom for vibration of the projecting free portion of said reed, electromagnetic drive means to vibrate said reed, contact means mounted on said support and disposed to be engaged by said reed, a cover for said reed, said electromagnetic means, and said contact means, first terminal means extending from said cover, first conductor means connecting said contact means and said reed to said terminal means and operative to provide therebetween an electrical connection through which the minute measuring circuit current is adapted to flow, other terminal means disposed in widely spaced and electrically insulated relation with respect to said first terminal means and extending through said cover at a position remote from said first terminal means, and other conductor means remotely located with respect to said first conductor means and connecting said other terminal means to said electromagnetic drive means to provide therebetween an electrical connection through which relatively large fluctuating energizing current is adapted to flow, said first terminal means and said first conductor means being constructed and arranged relative to said other terminal means and said other conductor means so as to minimize electromagnetic coupling between said first and said other conductor means.

12. Switching means for regularly interrupting, in synchronism with the fluctuation of a fluctuating energizing current, the minute flow of current in a direct current measuring circuit to create in said circuit a minute pulsating unidirectional flow of current the pulsations of which are synchronized with the fluctuations of the fluctuating energizing current, comprising, in combination, a support, a resilient reed fixed at one end to said support to project therefrom for vibration of the projecting free portion of said reed, electromagnetic drive means to vibrate said reed, a pair of contacts mounted on said support and disposed on opposite sides of said reed to be engaged by the latter, a cover for said reed, said electromagnetic means, and said contacts, first terminal means extending from said cover, first conductor means connecting said contact means and said reed to said terminal means and operative to provide therebetween an electrical connection through which the minute measuring circuit current is adapted to flow, other terminal means disposed in widely spaced and electrically insulated relation with respect to said first terminal means and extending through said cover at a position remote from said first terminal means, and other conductor means remotely located with respect to said first conductor means and connecting said other terminal means to said electromagnetic drive means to provide therebetween an electrical connection through which relatively large fluctuating energizing current is adapted to flow, said first terminal means and said first conductor means being constructed and arranged relative to said other terminal means and said other conductor means so as to minimize electromagnetic coupling between said first and said other conductor means.

13. Switching means for regularly interrupting, in synchronism with the fluctuation of a fluctuating energizing current, the minute flow of current in a direct current measuring circuit to create in said circuit a minute pulsating unidirectional flow of current the pulsations of which are synchronized with the fluctuations of the fluctuating energizing current, comprising, in combination, a support, a resilient reed fixed at one end to said support to project therefrom for vibration of the projecting free portion of said reed, electromagnetic drive means to vibrate said reed, contact means mounted on said support and disposed to be engaged by said reed, a cover for said reed, said electromagnetic means, and said contact means, first terminal means extending through said cover, first conductor means connecting said contact means and said reed to said terminal means and operative to provide therebetween an electrical connection through which the minute measuring circuit current is adapted to flow, other terminal means mounted on said support at a position remote from said first terminal means, and other conductor means remotely located with respect to said first conductor means and connecting said other terminal means to said electromagnetic drive means to provide therebetween an electrical connection through which relatively large fluctuating energizing current is adapted to flow, said first terminal means and said first conductor means being constructed and arranged relative to said other terminal means and said other conductor means so as to minimize electromagnetic coupling between said first and said other conductor means.

14. Switching means for regularly interrupting, in synchronism with the fluctuation of a fluctuating energizing current, the minute flow of current in a direct current measuring circuit to create in said circuit a minute pulsating unidirectional flow of current the pulsations of which are synchronized with the fluctuations of the fluctuating energizing current, comprising, in combination, a support, a resilient reed fixed at one end to said support to project therefrom for vibration of the projecting free portion of said reed, electromagnetic drive means to vibrate said reed, a pair of contacts mounted on said support and disposed on opposite sides of said reed to be engaged by said reed, a cover for said reed, said electromagnetic means, and said contacts, first terminal means extending through said cover, first conductor means connecting said contact means and said reed to said terminal means and operative to provide therebetween an electrical connection through which the minute measuring circuit current is adapted to flow, other terminal means mounted on said support at a position remote from said first terminal means, and other conductor means remotely located with respect to said first conductor means and connecting said other terminal means to said electromagnetic drive means to provide therebetween an electrical connection through which relatively large fluctuating energizing current is adapted to flow, said first terminal means and said first conductor means being constructed and arranged relative to said other terminal means and said other conductor means so as to minimize electromagnetic coupling between said first and said other conductor means.

15. Switching means for regularly interrupting, in synchronism with the fluctuation of a fluctuating energizing current, the minute flow of current in a direct current measuring circuit to create in said circuit a minute pulsating unidirectional flow of current the pulsations of which are synchronized with the fluctuations of the fluctuating energizing current, comprising, in combination, a male plug provided with terminals, a supporting plate mounted on said plug, a resilient reed fixed at one end to said supporting plate for vibration of the free portion of said reed, electromagnetic drive means to vibrate said reed, contact means mounted on said supporting plate and disposed to be engaged by said reed, a cup-shaped cover for said supporting plate, said reed, said electromagnetic means, and said contact means constructed and arranged to electrically and magnetically shield said reed and said contact means from extraneous electrical and magnetic effects, and also to protect the enclosed elements from dust and corrosive atmospheres, said plug being arranged to close the bottom and open end of said cover, means supported by said plug independently of said supporting plate, terminal means extending through the top of said cover and supported by said means, first conductor means connecting said contact means and said reed to said terminals of said plug and operative to provide therebetween an electrical connection through which the minute measuring circuit current is adapted to flow, and other conductor means remotely located with respect to the said first conductor means and connecting said terminal means to said electromagnetic drive means to provide therebetween an electrical connection through which relatively large fluctuating energizing current is adapted to flow, said plug terminals and said first conductor means being constructed and arranged relative to said terminal means and said other conductor means so as to minimize electromagnetic coupling between said first and said other conductor means.

16. Switching means for regularly interrupting, in synchronism with the fluctuation of a fluctuating energizing current, the minute flow of current in a direct current measuring circuit to create in said circuit a minute pulsating unidirectional flow of current the pulsations of which are synchronized with the fluctuations of the fluctuating energizing current, comprising, in combination, a male plug provided with terminals, a metallic supporting plate mounted on said plug, a resilient reed fixed at one end to said supporting plate for vibration of the free portion of said reed, electromagnetic drive means to vibrate said reed, contact means mounted on one side of said supporting plate and disposed to be engaged by said reed, a cup-shaped metallic cover for said supporting plate, said reed, said electromagnetic means, and said contact means, said cover electrically and magnetically shielding said reed and said contact means from extraneous electrical and magnetic effects, and also protecting the enclosed elements from dust and corrosive atmospheres, said plug being arranged to close the bottom and open end of said cover, terminal means extending through said cover at a position remote from said open end thereof and positioned relative to the side of said supporting plate opposite to that on which said contact members are mounted, first conductor means connecting said contact means and said reed to said terminals of said plug and operative to provide therebetween an electrical connection through which the minute measuring circuit current is adapted to flow, and other conductor means remotely located with respect to said first conductor means and connecting said terminal means to said electromagnetic drive means to provide therebetween an electrical connection through which relatively large fluctuating energizing current is adapted to flow, said plug terminals and said first conductor means being constructed and arranged relative to said terminal means and said other conductor means so as to minimize electromagnetic coupling between said first and said other conductor means.

FREDERICK W. SIDE.

REFERENCES CITED

The following references are of record in the file of this patent:

UNITED STATES PATENTS

| Number | Name | Date |
|---|---|---|
| 178,399 | Bell | June 6, 1876 |
| 587,436 | Geiger | Aug. 3, 1897 |
| 928,021 | Bliss | July 13, 1909 |
| 1,048,670 | Fessenden | Dec. 31, 1912 |
| 1,166,129 | Heyl | Dec. 28, 1915 |
| 1,657,486 | Scott | Jan. 31, 1928 |
| 1,671,245 | Kraus | May 29, 1928 |
| 2,043,746 | Garstang | June 9, 1936 |
| 2,055,093 | Wise | Sept. 22, 1936 |
| 2,071,384 | Barrett | Feb. 23, 1937 |
| 2,072,578 | Barrett | Mar. 2, 1937 |
| 2,096,276 | Garstang | Oct. 19, 1937 |
| 2,112,327 | Bodle | Mar. 29, 1938 |
| 2,114,189 | Kronmiller | Apr. 12, 1938 |
| 2,140,792 | Dressel et al. | Dec. 20, 1938 |
| 2,286,848 | Garstang | June 16, 1942 |
| 2,288,449 | Hanley | June 30, 1942 |
| 2,297,659 | Lorant | Sept. 29, 1942 |
| 2,352,522 | Eitel et al. | June 27, 1944 |